United States Patent Office 3,425,987
Patented Feb. 4, 1969

3,425,987
POLYOLEFIN STABILIZER COMPOSITIONS
Hendrikus J. Oswald, Morristown, Edith Turi, Livingston, and Richard B. Lund, Whippany, N.J., assignors to Allied Chemical Corporation, New York, N.Y., a corporation of New York
No Drawing. Filed Jan. 24, 1964, Ser. No. 339,857
U.S. Cl. 260—45.95                                7 Claims
Int. Cl. C08f 29/02, 45/58

ABSTRACT OF THE DISCLOSURE

This specification discloses stabilizer systems for poly-α-olefins, particularly polypropylene, which protect the polymer from the effects of oxygen over very long periods of time. These systems comprise a synergistic combination of a phenol including 2,6-bis(2'-hydroxy-3' - t - butyl - 5' - methylbenzyl) - 4 - methylphenol, 2,2'-methylene-bis(4-ethyl-6-t-butylphenol), 4,4'-thiobis (6-t-butyl-m-cresol) and α,α'-bis(p-hydroxyphenyl)-p-xylene and a phosphorous acid aromatic diester including diphenyl phosphite and bis(p-dodecylphenyl) phosphite.

The extensive use of aliphatic poly-α-olefins such as those obtained from ethylene, propylene, 1-butene, 1-pentene and 4-methyl-1-pentene, in various manufactured products, has led to recognition of their rapid deterioration when exposed to atmospheric oxygen. It has been theorized that this deterioration is caused by diffusion or molecular oxygen from the air into the polymer with subsequent reaction therewith so as to form oxygen-containing groups which provide weak links in the polymer chain. As a result of oxygen diffusion, scission also occurs resulting in the formation of shorter chains and loss of the desired mechanical properties possessed by the original high polymeric structure of the material. Regardless of mechanism, degradation in structure and in properties is observed in that the molecular weight of the polymer decreases, its color darkens, and its tensile strength as well as other physical properties of the polymer are diminished after exposure to air, particularly at temperatures higher than room temperatures.

Various additives to poly-α-olefins have been proposed in the prior art, in order to prevent the degradation process. A variety of phenolic compounds, as well as inorganic and organic phosphorous compounds have been used for this purpose.

The class of phosphorous compounds most frequently used is that of the organic triesters of phosphorous acid, for example, triphenyl phosphite, trilauryl phosphite and tri(nonylphenyl) phosphite. Mixed esters, such as di(p-tertiary butylphenyl)monophenyl phosphite, have also been used.

It has been noted by previous investigators in this field that a synergistic effect can often be secured by combinations of compounds such as a phenolic compound and a phosphite but it has also been the experience of these investigators that such synergistic values cannot be predicted and that combinations which, by analogy, may seem likely to produce a synergistic result, in effect, do not behave as predicted.

The stabilizers and stabilizer systems of the prior art were inadequate to render the poly-α-olefins stable for sufficient lengths of useful life. Further inadequacies of prior art stabilizers are manifested in the darkening of the resins. Some of the darkening occurs during the shaping of items from the resin, which often occurs at temperatures up to 275° C. At these elevated temperatures the prior art stabilizers tend to break down more readily than the resin itself thereby making the situation worse than if no stabilizer had been used.

Since retention of the original properties for a life of at least 20 years is needed for the polymer to be regarded as satisfactory, any research directed towards the finding of stabilizing additives must obviously be based upon accelerated testing at temperatures higher than those anticipated in actual use, and also upon theoretical and extrapolational considerations.

A better than average combination of the following conditions should be exhibited by the stabilizer if it is to be recommended for practical use: good compatibility with the polymer; only minor discoloration of the polymer with aging or upon admixture of stabilizer; low volatility so as to be retained under whatever high temperatures are encountered by the polymer during fabrication and use; long induction time before a substantial amount of oxygen reacts with the polymer; and only slight effect upon the normal rate of thermal depolymerization of the polymer. Furthermore, since the stabilizers themselves are generally less stable at some high processing temperatures e.g. 275° C., such as may be used in the processing of very high molecular weight polymers or in very fast injection molding cycles, the stabilizer should not markedly worsen the stability of the polymer properties during brief exposure to such high temperatures during forming operations.

The compositions of the invention meet these requirements as will be detailed hereinbelow.

According to the invention, it was discovered that when phosphorous acid diesters are combined with specific phenolic compounds, an unexpected synergistic stabilizing effect in poly-α-olefinic compounds can be obtained by such mixtures. The following phenolic compounds were found to exhibit such synergistic effect when combined with the diesters: 4,4'-thio-bis(6-t-butyl-m-cresol); 2,2' - methylene-bis(4-ethyl-6-t-butylphenol); α,α'-bis(p-hydroxyphenyl) p-xylene; and 2,6-bis(2'-hydroxy-3'-t-butyl - 5' - methylbenzyl)4-methylphenol. The combined synergistic stabilization effect is greater than the normally expectable additive effect of such stabilizers would be, and also greater than the synergistic effect obtained with the prior art stabilizing combinations.

Also in accordance with the invention, a specific phosphorous acid diester, bis(p-dodecylphenyl)phosphite was found, as a new chemical substance, having the following formula:

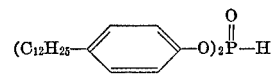

wherein the $C_{12}H_{25}$ group may be of a straight or branched-chain structure, however, it is believed to be a mixture of both.

This new compound can be made by reacting dodecylphenol with phosphorus trichloride, removing the excess dodecylphenol by distillation up to 210° C. The resulting compound is tris(dodecylphenyl)phosphite. This intermediate is then reacted with phosphorous acid to obtain the novel phosphite.

Compatibility of a stabilizing additive with the polymer requires that no segregation between the resin and the components of the stabilizer occur by exudation, migration, or the forming of distinct phases in either the liquid or the solid state.

Discoloration of the polymer by the additive is judged by comparison of the homogeneous mixture with the original color of the polymer based on any of various color standards and can be expressed, for instance, in terms of percent yellowness according to Method 613.1 of Federal Specification TT–P–141b, Jan. 15, 1949 for Paint, Varnish, Lacquer and Related Materials.

Volatility of the stabilizer is judged by the boiling point and the vapor pressure of the additive at the temperature of use. If volatility is high, loss of the additive under the conditions of extruding, molding or other fabricating operations will result in decreased protection.

The stability of the stabilized resin compared to the stability of the unstabilized resin at high temperatures, such as in excess of 250° C., can be most conveniently expressed as the rate constant ($K_s/K_u$) of the stabilized and the unstabilized resins at a given temperature. Since the value of a given unstabilized resin is a constant, in the comparison of various stabilizer systems, a ratio as low as possible is desired. The rate constant can be determined from the molecular weight of the tested materials by the following formula:

$$\frac{1}{Mv_t} = Kt + \frac{1}{Mv_{t=0}}$$

where $Mv_{t=0}$ is the original molecular weight. $Mv_t$ is the molecular weight of the material after exposure to the temperature for $t$ seconds, and K is the rate constant.

A significant test for value of an additive and the test which is regarded as most important is the test for determining the length of the induction time for oxygen absorption by the polymer to develop from a very slow absorption into a comparatively rapid auto-catalytic reaction. The extent of oxygen absorption was determined on small, 25 mil thick polymer samples, which were molded at 250° C. These pieces were exposed to an oxygen atmosphere at a regulated, controlled temperature in apparatus described in the J. Poly. Sci., 41 No. 1, p. 11 (1959) by Hawkins, Matreyek and Winslow. The amount of oxygen absorption was measured over a definite period of time. The oxygen absorption shows only a slight gradual increase with time up to a point where a break in the absorption vs. time curve occurred, the curve continuing from this point to rise rapidly, and at least at an incipient linear progress, through the autocatalytic, usually catastrophic breakdown process of the polymer chain structure. By extrapolating the at least incipiently linear portion of the curve after the break in the curve, the induction time is obtained at the intersection of the extrapolated line with the time axis. The higher the induction time, the better is the stabilizer system in prolonging the useful life of the polymer in an oxygen-containing atmosphere.

Aliphatic poly-α-olefins during their useful life are generally exposed to temperatures not in excess of 75° C.; therefore, the figure most indicative of the useful life of the polymer is the induction time at this temperature. Since the degradation of the polymer at this temperature takes too long a time for a practical evaluation of the effects of stabilizers, the experiments leading to the discovery of the present invention were conducted under accelerated circumstances, at higher temperatures and in pure oxygen instead of air. The data obtained at 100, 120 and 140° C. were plotted in an Arrhenius plot as function of time to obtain a linear relationship, and the line was extrapolated to 75° C. on the axis bearing the reciprocal temperature values. The resulting induction time in hours can be converted, for ease of comparison, to be expressed in years by dividing the hours by 8760. The induction time, which was obtained in a 100 percent oxygen atmosphere, can be expressed as the induction time in air by considering the generally accepted reaction mechanism for the initial stages of the oxidation process. This leads to the conclusion that the induction time at a given temperature should be proportional to the reciprocal square root of the partial pressure of oxygen in air, according to the following equation:

$$t_{ind} = \frac{C}{\sqrt{P_{O_2}}}$$

where $t_{ind}$ is the induction time, C is a constant, being a function of the system and the temperature, and $P_{O_2}$ is the partial pressure of the oxygen in the environment. Since air contains 21 percent by volume oxygen, the induction time in air at any temperature is 2.18 times longer than in a 100 percent oxygen environment, according to the above equation.

In the following examples the stabilizing effect of the specfic phenolic compounds and phosphorous acid diesters are shown separately as well as the results produced by their synergistic combinations according to the invention. An example of a prior art phosphorous acid triester combined with a phenolic compound is shown for comparison purposes, to show the superior synergistic behavior of the phosphorous acid diesters. It was found that only little or no changes in the stabilizing characteristics of the mixtures of the invention can be accomplished by varying the concentration of the stabilizer, the optimum stabilizer concentration range being between 0.1 and 2% by weight based on the polyolefin resin. Parts and percentages are by weight, temperatures in degrees centigrade, and the stabilizer concentrations used in the examples are all 1% by weight based on the polyolefinic resin. The constituents of the mixed stabilizers are mixed in equal weight proportions except where indicated otherwise.

Examples 1–16

3 parts low pressure polypropylene, manufactured in accordance with Example 3 of Italian Patent No. 647,788 were suspended in 19 parts acetone, the acetone in each example containing one of the stabilizers listed in Table 1. The mixture of each example was stirred under an inert atmosphere at room temperature, until the acetone evaporated. The dried polymer which was thus impregnated with the stabilizer was then molded at 250° C. to produce 25 mil. thick test samples.

TABLE 1.—STABILIZERS USED IN EXAMPLES 1–16

| Example No.: | Stabilizer |
|---|---|
| 1 | Unstabilized polypropylene. |
| 2 | Diphenylphosphite. |
| 3 | Bis(p-dodecylphenyl)phosphite. |
| 4 | Tris(nonylated phenyl)phosphite. |
| 5 | 4,4'-thio-bis(6-t-butyl-m-cresol). |
| 6 | 2,6-bis(2'-hydroxy-3'-t-butyl - 5'methyl - benzyl)-4-methylphenol. |
| 7 | 2,2' - methylene - bis(4-ethyl-6-t-butyl - phenol). |
| 8 | α,α'-Bis(p-hydroxyphenyl)p-xylene. |
| 9 | Diphenylphosphite+4,4' - thio - bis(6-t-butyl-m-cresol), 2:1 by weight. |
| 10 | Triphenylphosphite+4,4' - thio - bis(6-t-butyl-m-cresol), 2:1 by weight. |
| 11 | Diphenyl phosphite+2,2'-methylene-bis (4-ethyl-6-t-butylphenol.) |
| 12 | Tris(nonylated phenyl)phosphite+2,2'-methylene - bis(4 - ethyl - 6 - t - butylphenol). |
| 13 | Diphenylphosphite+α,α'-bis(p-hydrox - phenyl)p-xylene. |
| 14 | Bis(p - dodecylphenyl)phosphite+α,α' - bis(p-hydroxyphenyl)p-xylene. |
| 15 | Diphenylphosphite+2,6-bis(2'-hydroxy - 3'-t-butyl-5'-methylbenzyl)4 - methylphenol. |
| 16 | Tris(nonylated phenyl)phosphite+2,6 - bis(2' - hydroxy-3'-t-butyl-5'-methylbenzyl)4-methylphenol. |

In Table 2 the induction time in hours is shown for the specific compositions of Table 1. The parenthetical figure following the induction time at 75° C. is the induction time expressed in years at 750 C. in air.

TABLE 2.—INDUCTION TIME MEASURED BY OXYGEN ABSORPTION

| Ex. No. | Induction time in oxygen [hrs.] | | | | $K_s/K_u$ | |
|---|---|---|---|---|---|---|
| | 75° (years in air) | 100° | 120° | 140° | 250° | 275° |
| 1 | 70 (0.017) | 4 | 0.6 | 0.1 | | |
| 2 | $1.0 \times 10^4$ (2.5) | | 60 | 10.5 | | |
| 3 | $1.5 \times 10^4$ (3.7) | 800 | | 15 | | |
| 4 | | | | 67 | | |
| 5 | | | | 360 | | |
| 6 | | 2,900 | | 120 | | |
| 7 | $6.2 \times 10^4$ (15) | 5,900 | 1,000 | 235 | | |
| 8 | $8.5 \times 10^4$ (21) | | 370 | 52 | | 3 |
| 9 | | | 1,560 | 390 | 6 | 4 |
| 10 | | | 1,060 | | 34 | |
| 11 | $8.0 \times 10^4$ (20) | | 1,425 | 340 | | 1.2 |
| 12 | $1.25 \times 10^5$ (31) | | 1,420 | 290 | | 2 |
| 13 | $3.4 \times 10^5$ (84) | | 800 | 89 | | |
| 14 | $1.9 \times 10^5$ (47) | | 580 | 68 | | |
| 15 | $3.3 \times 10^5$ (82) | | 1,300 | 180 | | 0.9 |
| 16 | $1.7 \times 10^5$ (42) | | 1,395 | | 4.9 | 2.4 |

As it can be seen from Table 2, the diaryl phosphites alone increase the stability of polypropylene but not as outstandingly as when combined with the specific phenolic compounds according to the invention. By comparing Examples 9 and 10, it can be seen that the diaryl phosphite shows a longer induction time when combined with a specific phenolic compound than the triaryl phosphite prior art stabilizer.

While 4,4'-thio-bis(6-t-butyl-m-cresol) was shown to provide reasonably good induction times without a phosphite addition, from the $K_s/K_u$ values it is shown as being unstable at the high processing temperature of 250°, therefore, it also deleteriously affects the resin at these temperatures. On the other hand. when mixed with diphenylphosphite, the stability of the resin is considerably improved at the high temperatures. It can be also seen from the $K_s/K_u$ values that the prior art triphenylphosphite mixture is considerably less effective than diaryl phosphites according to the invention.

Example 17.—Preparation of bis(p-dodecylphenyl) phosphite 52.4 parts dodecylphenol and 8.2 parts phosphorus trichloride were heated to 175° with continuous stirring, and held at that temperature for 2¼ hours, until all evolution of hydrogen chloride ceased. Material boiling up to 210° was removed by distillation under 2 mm. Hg pressure, thereby removing the excess dodecylphenol, leaving a still residue of 51.2 parts tris(dodecylphenyl)phosphite.

2.44 parts phosphorus acid were added to this residue and the mixture was heated to 175° for 4¼ hours. The reaction mixture was cooled and filtered through a fritted glass filter. The filtrate was distilled under 1 mm. Hg pressure, removing thereby 13 parts, mostly dodecylphenol, between 127° and 192°. The still residue was dissolved in acetone, filtered and the acetone evaporated, leaving 37.5 parts of a clear, light yellow viscous liquid, identified as bis(p-dodecylphenyl)phosphite by its infrared absorption spectrum.

It is to be understood that the invention was disclosed by way of specific examples, therefore, the full scope of the invention is to be limited only by the appended claims.

We claim:

1. Polypropylene stabilized against ageing with a stabilizer consisting essentially of, in combination, a phosphoric acid aromatic diester selected from the group consisting of diphenyl phosphite and bis(p-dodecylphenyl) phosphite in a concentration of between 0.1 and 2 weight percent of said polypropylene, and a phenolic compound selected from the group consisting of 2,6-bis(2'-hydroxy-3'-t-butyl-5'-methylbenzyl)4 - methylphenol; 2,2'-methylene-bis-(4-ethyl-6-t-butylphenol); and α,α'-bis(p-hydroxyphenyl)p-xylene, in a concentration of between 0.2 and 2 weight percent of said polypropylene.

2. The stabilized resin composition of claim 1 wherein said phosphorous acid aromatic diester is diphenyl phosphite.

3. The stabilized resin composition of claim 2 wherein said phenolic compound is 2,6-bis(2'-hydroxy-3'-t-butyl-5'-methylbenzyl)4-methylphenol.

4. The stabilized resin composition of claim 2 wherein said phenolic compound is 2,2'-methylene-bis(4-ethyl-6-t-butylphenol).

5. The stabilized resin composition of claim 2 wherein said phenolic compound is α,α'-bis(p-hydroxyphenyl)p-xylene.

6. The stabilized resin composition of claim 1 wherein said phosphorous acid aromatic diester is bis(dodecylphenyl)phosphite.

7. The stabilized resin composition of claim 6 wherein said phenolic compound is α,α'-bis(p-hydroxyphenyl)p-xylene.

References Cited

UNITED STATES PATENTS

| 3,103,501 | 9/1963 | Shearer et al. | 260—45.95 |
| 3,115,465 | 12/1963 | Orloff et al. | 260—45.95 |
| 3,145,176 | 8/1964 | Knapp et al. | 260—45.95 |
| 3,149,093 | 9/1964 | Hecker et al. | 260—45.7 |

FOREIGN PATENTS 1,235,047  5/1960  France.

DONALD E. CZAJA, *Primary Examiner.*

M. J. WELSH, *Assistant Examiner.*

U.S. Cl. X.R.

260—45.7